(12) United States Patent
Jeon

(10) Patent No.: US 10,938,013 B2
(45) Date of Patent: Mar. 2, 2021

(54) BATTERY MODULE

(71) Applicant: Samsung SDI Co., Ltd., Yongin-si (KR)

(72) Inventor: Doosung Jeon, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 69 days.

(21) Appl. No.: 16/319,177

(22) PCT Filed: Jul. 17, 2017

(86) PCT No.: PCT/KR2017/007643
§ 371 (c)(1),
(2) Date: Jan. 18, 2019

(87) PCT Pub. No.: WO2018/016818
PCT Pub. Date: Jan. 25, 2018

(65) Prior Publication Data
US 2019/0288265 A1    Sep. 19, 2019

(30) Foreign Application Priority Data
Jul. 21, 2016  (KR) .......................... 10-2016-0092885

(51) Int. Cl.
*H01M 2/20*      (2006.01)
*H01M 2/10*      (2006.01)

(52) U.S. Cl.
CPC ............ *H01M 2/206* (2013.01); *H01M 2/10* (2013.01); *H01M 2/1077* (2013.01);
(Continued)

(58) Field of Classification Search
None
See application file for complete search history.

(56) References Cited

U.S. PATENT DOCUMENTS 5,804,770 A    9/1998 Tanaka
6,097,173 A    8/2000 Bryant, Jr.
(Continued)

FOREIGN PATENT DOCUMENTS

JP    11-167911 A     6/1999
JP    3134741 B2     12/2000
(Continued)

OTHER PUBLICATIONS

International Search Report for corresponding International Application No. PCT/KR2017/007643, dated Oct. 23, 2017, 5pp.
(Continued)

*Primary Examiner* — Wyatt P McConnell
(74) *Attorney, Agent, or Firm* — Lewis Roca Rothgerber Christie LLP

(57) ABSTRACT

Provided is a battery module. The battery module includes: a bus bar including first and second portions electrically connected respectively to different battery packs; and a bus bar cover covering the bus bar to insulate the bus bar, wherein the bus bar cover includes first and second portions covering the first and second portions of the bus bar and a hinge portion providing pivotable connection between the first and second portions. Accordingly, sufficient insulation may be secured for the bus bar electrically connecting different battery packs, and malfunction and safety accidents caused by the short circuit of the bus bar through which a high-voltage charge/discharge current flows may be prevented.

17 Claims, 7 Drawing Sheets

(52) U.S. Cl.
CPC ....... *H01M 2/1083* (2013.01); *H01M 2/1094* (2013.01); *H01M 2/20* (2013.01); *H01M 2200/00* (2013.01); *H01M 2220/10* (2013.01); *H01M 2220/20* (2013.01)

(56) References Cited

U.S. PATENT DOCUMENTS

| | | |
|---|---|---|
| 8,263,249 B2 | 9/2012 | Yoon |
| 8,936,865 B2 | 1/2015 | Kim |
| 9,017,857 B2 | 4/2015 | Lee et al. |
| 9,553,340 B2 | 1/2017 | Kim |
| 2015/0207126 A1* | 7/2015 | Chorian .................. B60L 50/66 429/99 |

FOREIGN PATENT DOCUMENTS

| | | |
|---|---|---|
| JP | 2012-38558 | 2/2012 |
| JP | 2015-65055 A | 4/2015 |
| KR | 10-2007-0011654 A | 1/2007 |
| KR | 10-2010-0070170 A | 6/2010 |
| KR | 10-2011-0044130 A | 4/2011 |
| KR | 10-2013-0076506 A | 7/2013 |
| KR | 10-2014-0008838 A | 1/2014 |
| KR | 10-2014-0140958 A | 12/2014 |

OTHER PUBLICATIONS

Written Opinion for corresponding International Application No. PCT/KR2017/007643, dated Oct. 23, 2017, 5pp.
EPO Extended Search Report dated Mar. 11, 2020, for corresponding European Patent Application No. 17831291.4 (7 pages).
Korean Registration Determination Certificate dated Nov. 10, 2020, for corresponding Korean Patent Application No. 10-2016-0092885 (2 pages).

* cited by examiner

BATTERY MODULE

CROSS-REFERENCE TO RELATED APPLICATION(S)

This application is a National Phase Patent Application of International Patent Application Number PCT/KR2017/007643, filed on Jul. 17, 2017, which claims priority of Korean Patent Application No. 10-2016-0092885, filed Jul. 21, 2016. The entire contents of both of which are incorporated herein by reference.

TECHNICAL FIELD

The present disclosure relates to battery modules.

BACKGROUND ART

In general, secondary batteries are rechargeable, unlike primary batteries. Secondary batteries may be used as energy sources for mobile devices, electric vehicles, hybrid vehicles, electric bicycles, uninterruptible power supplies, or the like. Depending on the types of external devices to which they are applied, the secondary batteries may be used in the form of a single battery or in the form of a battery module in which a plurality of batteries are electrically connected and combined into one unit.

A small mobile device such as a mobile phone may operate for a certain time according to the output and capacity of a single battery. However, in the case of long-time driving or high-power driving such as in the case of an electric vehicle or a hybrid vehicle with high power consumption, a battery module may be preferred due to output and capacity issues. The battery module may increase the output voltage or the output current according to the number of built-in batteries.

The background art of the present disclosure is disclosed in Japanese Laid-open Patent Publication No. 2012-038558.

DESCRIPTION OF EMBODIMENTS

Technical Problem

Provided is a battery module that may secure sufficient insulation for a bus bar electrically connecting different battery packs and may prevent malfunction and safety accidents caused by the short circuit of the bus bar through which a high-voltage charge/discharge current flows.

Solution to Problem

According to an aspect of the present disclosure, a battery module includes: a bus bar including first and second portions electrically connected respectively to different battery packs; and a bus bar cover covering the bus bar to insulate the bus bar, wherein the bus bar cover includes first and second portions covering the first and second portions of the bus bar and a hinge portion providing pivotable connection between the first and second portions.

Advantageous Effects of Disclosure

According to an embodiment of the present disclosure, a battery module includes at least two battery packs and a bus bar electrically connecting adjacent battery packs. In this case, since a high-voltage charge/discharge current flows through the bus bar, when an external foreign substance or another internal structure contacts the bus bar, a safety accident may be caused and a charge/discharge current path may be short-circuited to cause malfunction. According to an embodiment of the present disclosure, sufficient insulation may be secured for the bus bar forming a charge/discharge path and a short circuit with respect to the external environment or the internal structure may be prevented and thus malfunction of the battery module and unexpected safety accidents may be prevented.

BEST MODE

According to an embodiment of the present disclosure, a battery module includes: a bus bar including first and second portions electrically connected respectively to different battery packs; and a bus bar cover covering the bus bar to insulate the bus bar, wherein the bus bar cover includes first and second portions covering the first and second portions of the bus bar and a hinge portion providing pivotable connection between the first and second portions.

For example, the first and second portions of the bus bar cover may each include a hollow portion exposing a coupling hole of each of the first and second portions of the bus bar and extending in a direction away from the bus bar.

For example, the hollow portion may be formed in a cylindrical shape extending while surrounding the coupling hole.

For example, the first and second portions of the bus bar may be arranged on different planes.

For example, the first and second portions of the bus bar may be arranged on inclined planes inclined with respect to each other.

For example, a bypass bent portion may be formed between the first and second portions of the bus bar.

For example, an insulator may be formed at the bypass bent portion.

For example, the hinge portion may extend across the bypass bent portion between the first and second portions and connect the first and second portions pivotably with respect to each other.

For example, the bypass bent portion may protrude to an opposite side with respect to the hinge portion.

For example, the first portion of the bus bar cover may include an assembly guide guiding assembly of the bus bar cover to the bus bar.

For example, the assembly guide may include an assembly hole into which the bus bar is inserted.

For example, the assembly guide may further include an assembly protrusion protruding toward the bus bar from a wall defining the assembly hole.

For example, the assembly protrusion may be formed along a long side portion of the wall defining the assembly hole.

For example, the second portion of the bus bar cover may include a locking jaw preventing separation from the bus bar.

For example, the locking jaw may be formed in a pair at both ends in a width direction of the bus bar cover.

For example, a closed hole-type assembly guide may be formed at the first portion of the bus bar cover, and an open hook-type locking jaw may be formed at the second portion of the bus bar cover.

For example, the bus bar cover may further include a barrier portion surrounding an opening exposing a portion of the bus bar at a position adjacent to the hollow portion and extending in a direction away from the bus bar.

MODE OF DISCLOSURE

Hereinafter, battery modules according to example embodiments of the present disclosure will be described with reference to the accompanying drawings.

Figure 1:
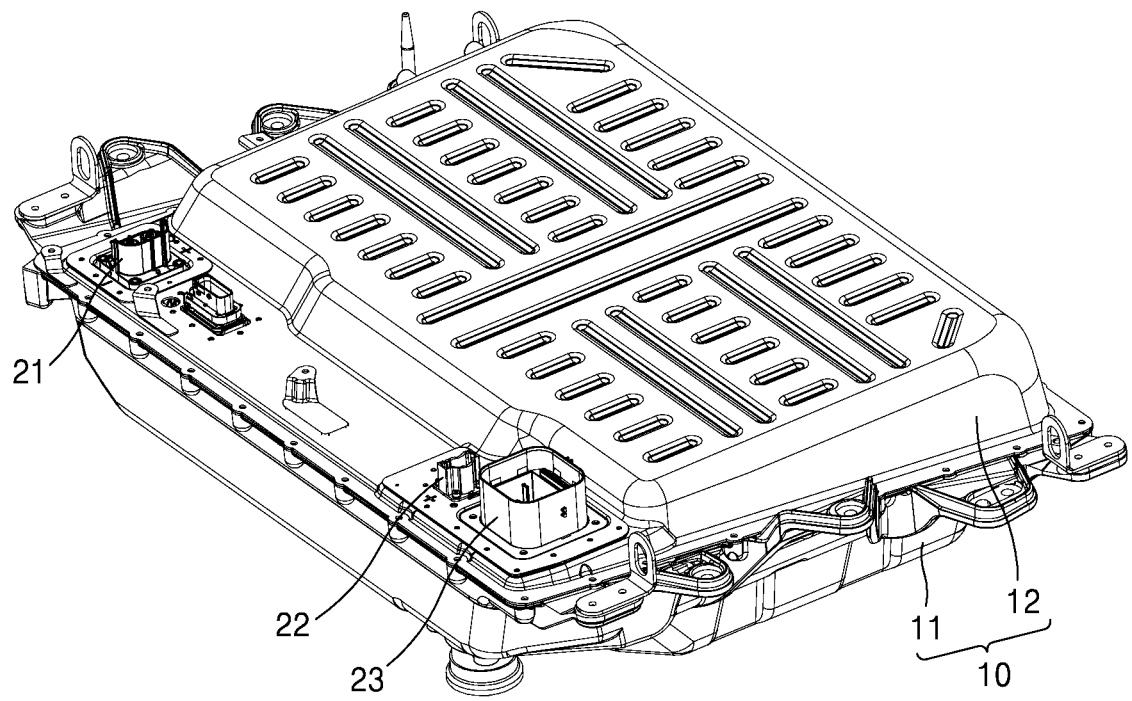
FIG. 1 illustrates a perspective view of a battery module according to an embodiment of the present disclosure.
Figure 2:
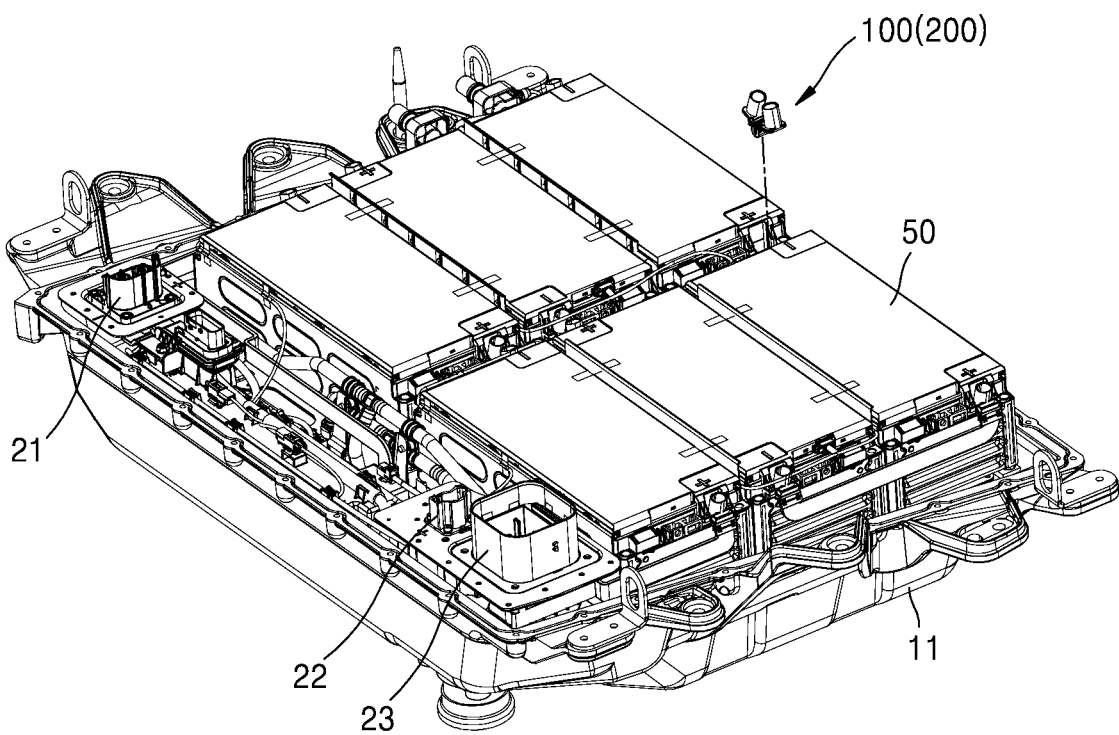
FIG. 2 illustrates a perspective view of the battery module illustrated in FIG. 1.

FIG. 1 illustrates a perspective view of a battery module according to an embodiment of the present disclosure. FIG. 2 illustrates a perspective view of the battery module illustrated in FIG. 1.

Referring to the drawings, the battery module may include a battery pack 50 and a housing 10 for accommodating the battery pack 50. For example, the housing 10 may include a frame 11 and a cover 12 covering the frame 11, which are coupled in opposite directions with a plurality of battery packs 50 therebetween. In an embodiment of the present disclosure, the battery pack 50 may include a plurality of battery packs 50. For example, the plurality of battery packs 50 may be electrically connected to each other, and a plurality of battery packs 50 may be electrically connected to each other in a serial manner, in a parallel manner, or in a serial-parallel hybrid manner to provide a desired electrical output. Adjacent battery packs 50 may be electrically connected to each other by using a bus bar 200. For example, one side of the bus bar 200 may be electrically connected to one battery pack 50 and the other side of the bus bar 200 may be electrically connected to another battery pack 50 such that one battery pack 50 and another battery pack 50 adjacent to each other may be electrically connected to each other. Particular technical details of the bus bar 200 will be described below.

The battery module may include a high-voltage connector 21 exposed outside the housing 10. For example, the high-voltage connector 21 may be formed on the frame 11 and may be formed to protrude above the cover 12 from the top of the frame 11. The battery module may provide driving power for a vehicle, and the high-voltage connector 21 may form an output terminal for supplying the driving power.

On the frame 11, it may include a circuit unit for controlling a charge/discharge operation of the battery pack 50, an auxiliary connector 22 for outputting a current of the battery pack 50, and a fuse block 23 for selectively blocking a current of the battery pack 50 in case of malfunction.

The auxiliary connector 22 may be exposed from the cover 12. The battery module may provide driving power for a vehicle, and the auxiliary connector 22 may supply driving power for in-vehicle electronics, not the driving power for the vehicle. The fuse block 23 may be exposed from the cover 12. In this case, a fuse box (not illustrated) forming a charge/discharge path of the battery pack 50 may be coupled onto the fuse block 23. The fuse box (not illustrated) may be formed on the charge/discharge path and may block a charge/discharge current in case of malfunction such as overheat or overcurrent. The fuse box (not illustrated) may include, for example, a variable resistor, the resistance of which varies according to temperature or a fuse capable of blocking the charge/discharge path according to Joule heating. By coupling the fuse box (not illustrated) onto the fuse block 23, the charge/discharge path may be formed and the preparation for driving the battery module may be completed.

The cover 12 may cover the frame 11 on which the high-voltage connector 21, the auxiliary connector 22, and the fuse block 23 are seated. In this case, the cover 12 may be formed to include an opening portion for exposing the high-voltage connector 21, the auxiliary connector 22, and the fuse block 23.

Figure 3:
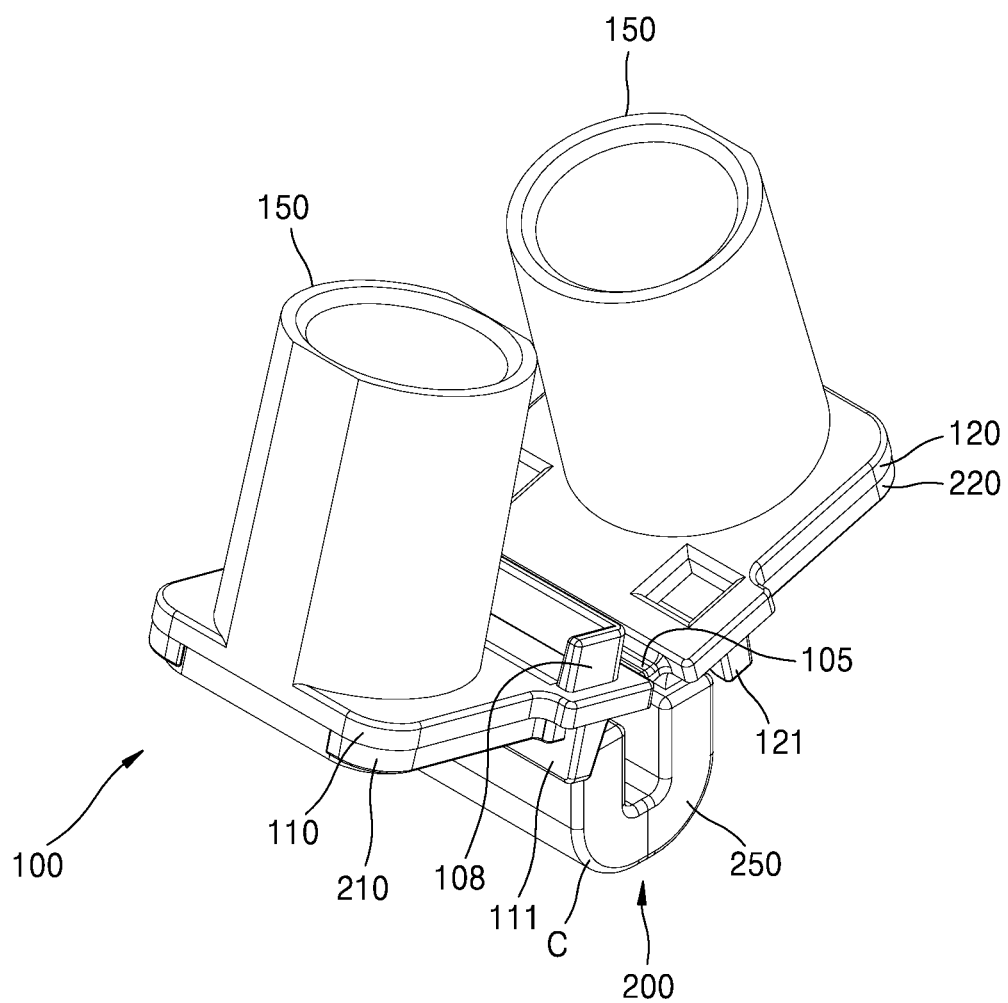
FIG. 3 illustrates a perspective view of a bus bar and a bus bar cover illustrated in FIG. 2.
Figure 4:
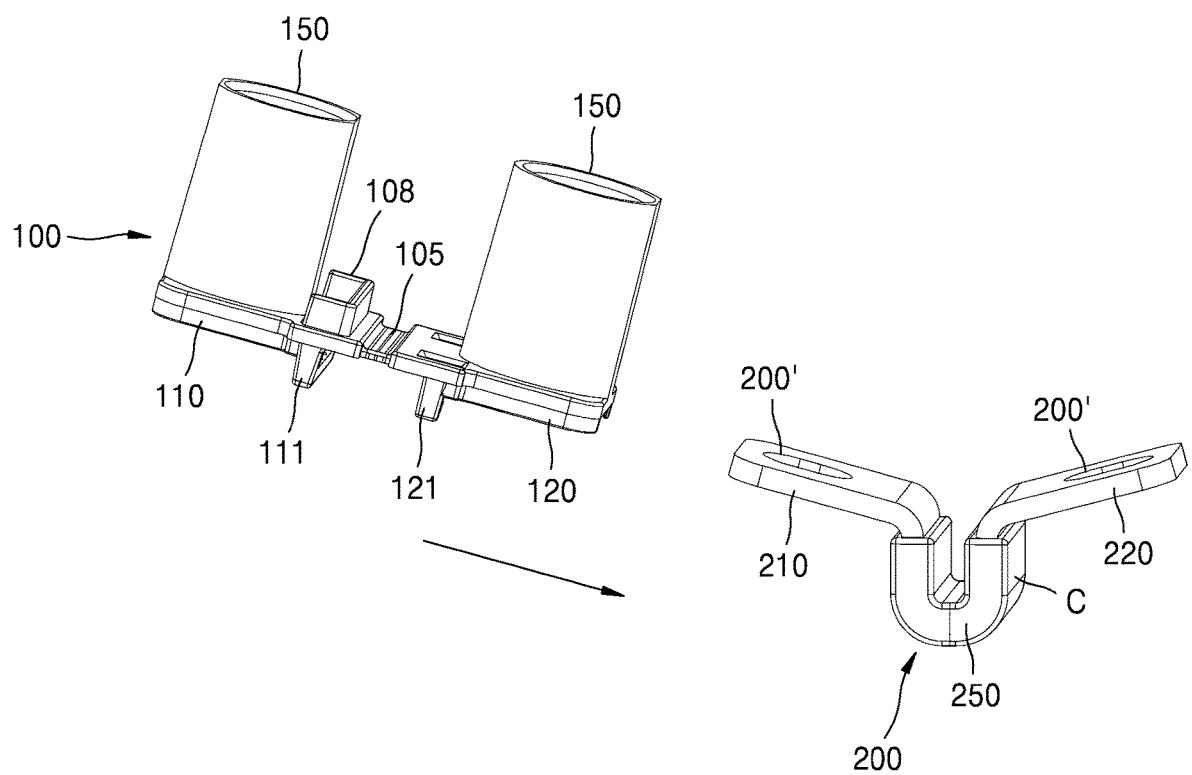
FIG. 4 illustrates a perspective view illustrating the assembly state of the bus bar and the bus bar cover illustrated in FIG. 3.
Figure 5:
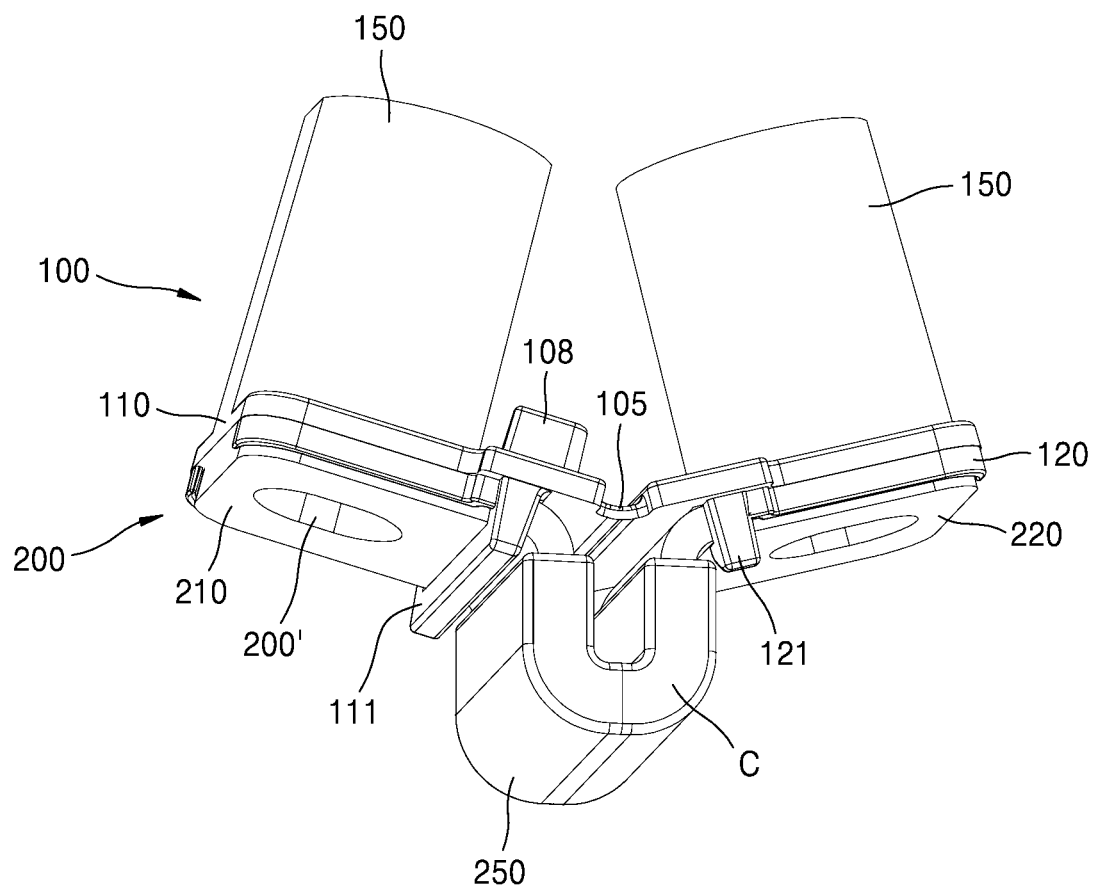
FIG. 5 illustrates a perspective view illustrating the bus bar and the bus bar cover of FIG. 3 in another direction.
Figure 6:
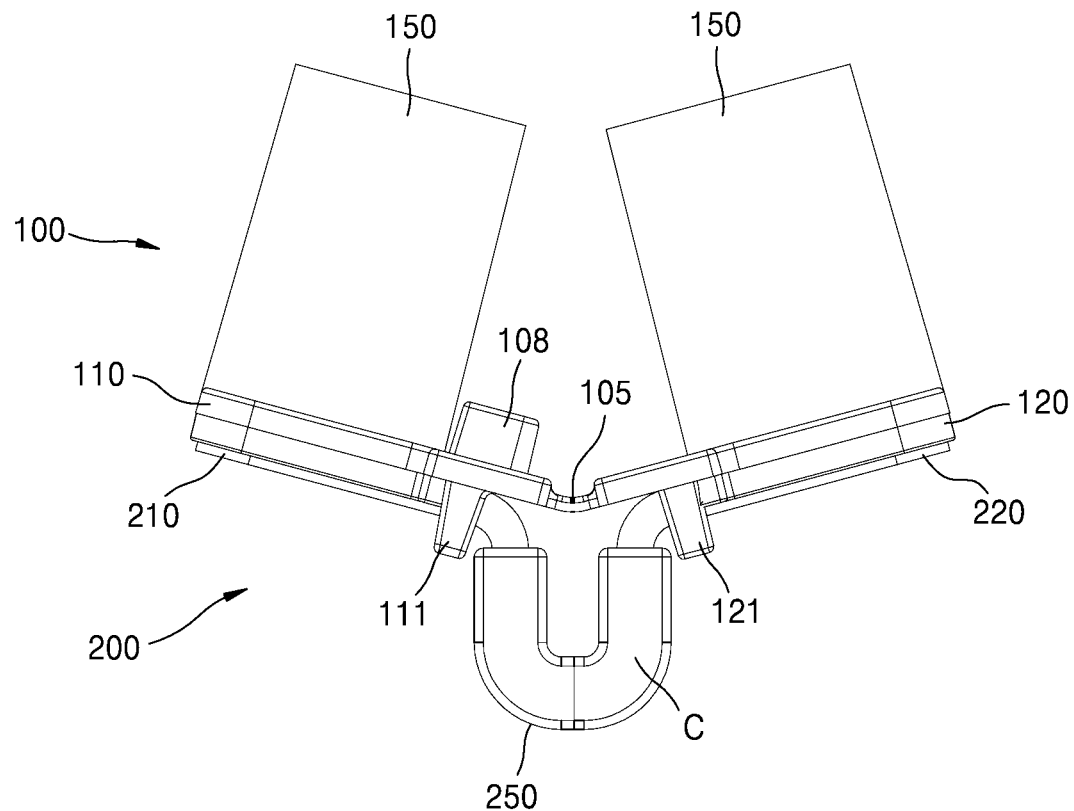
FIG. 6 illustrates a side surface of the bus bar and the bus bar cover illustrated in FIG. 3.
Figure 7:
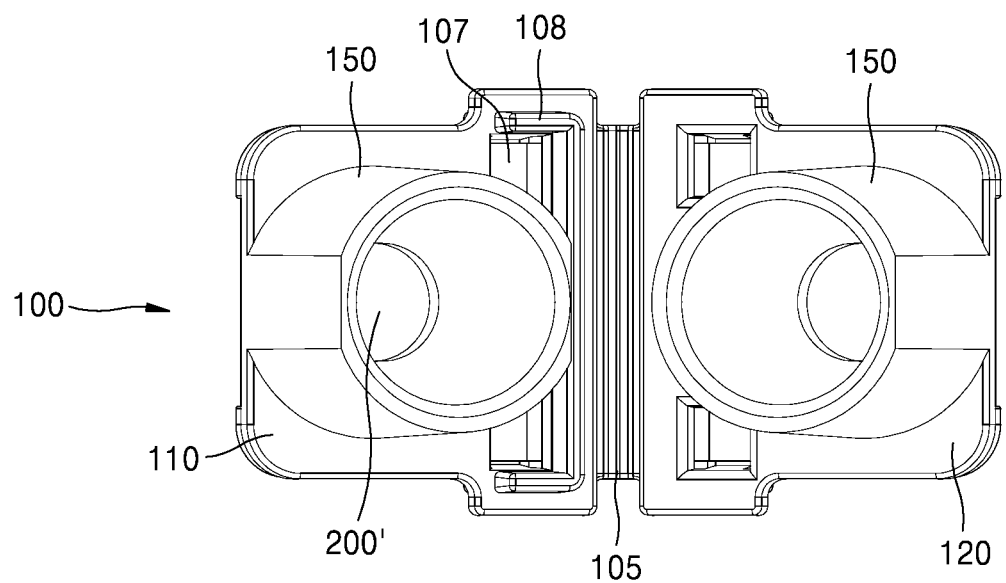
FIG. 7 illustrates a top surface of the bus bar and the bus bar cover illustrated in FIG. 3.
Figure 8:
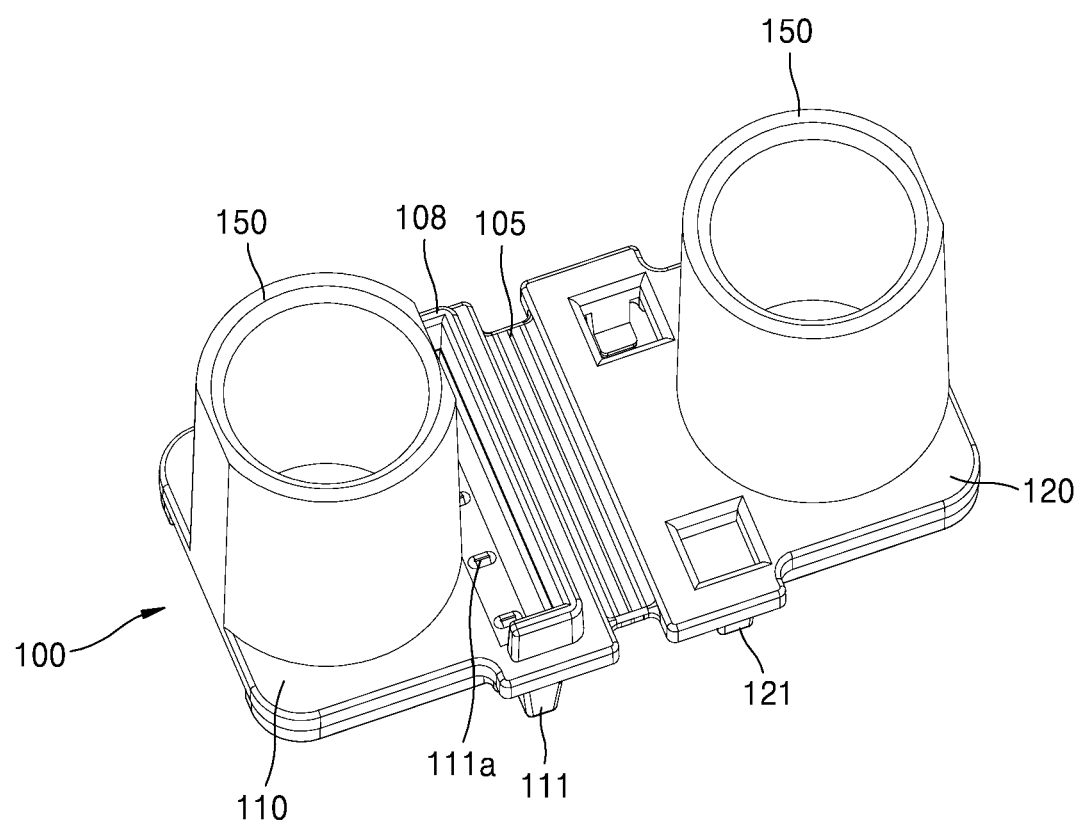
FIGS. 8 and 9 illustrate perspective views of the bus bar cover illustrated in FIG. 3.
Figure 9:
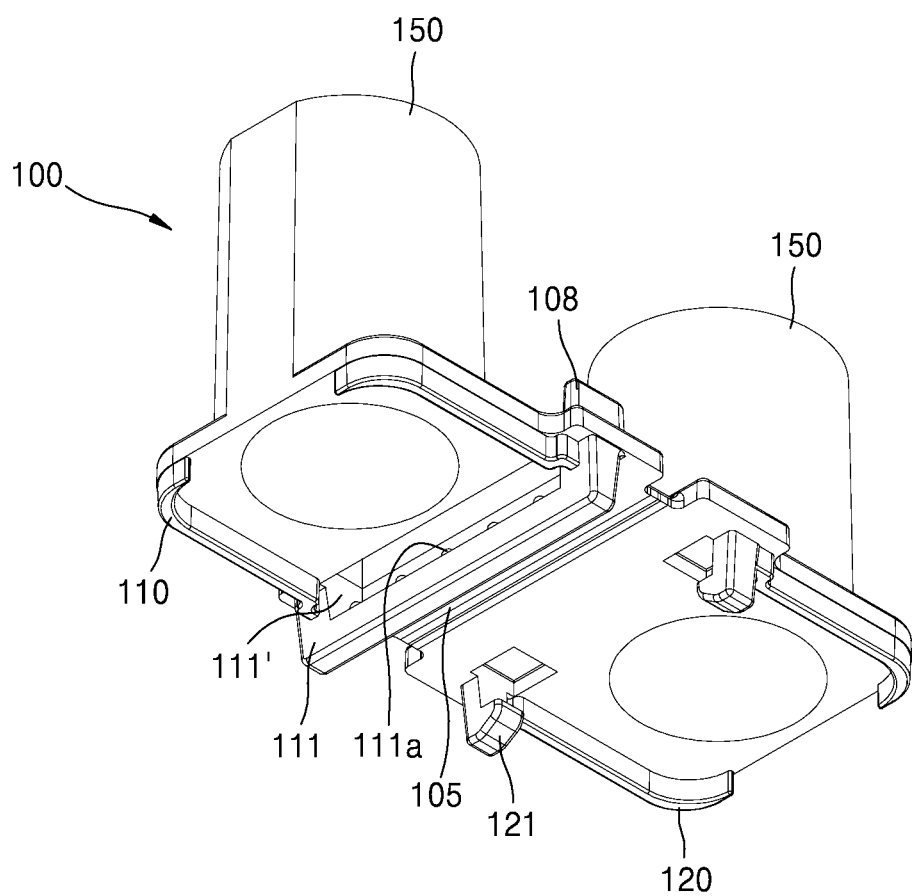

FIG. 3 illustrates a perspective view of a bus bar and a bus bar cover illustrated in FIG. 2. FIG. 4 illustrates a perspective view illustrating the assembly state of the bus bar and the bus bar cover illustrated in FIG. 3. FIG. 5 illustrates a perspective view illustrating the bus bar and the bus bar cover of FIG. 3 in another direction. FIG. 6 illustrates a side surface of the bus bar and the bus bar cover illustrated in FIG. 3. FIG. 7 illustrates a top surface of the bus bar and the bus bar cover illustrated in FIG. 3. FIGS. 8 and 9 illustrate perspective views of the bus bar cover illustrated in FIG. 3.

Referring to FIG. 4, the bus bar 200 may have a symmetrical shape in which one end side and the other end side thereof are symmetrical to each other. For example, the bus bar 200 may include a first portion 210 of one end and a second portion 220 of the other end with a bypass bent portion 250 as the center therebetween, and the first and second portions 210 and 220 may have a symmetrical shape with respect to the bypass bent portion 250. The first and second portions 210 and 220 of the bus bar 200 may be electrically connected respectively to different battery packs 50.

The bypass bent portion 250 of the bus bar 200 may provide an elastic connection between different battery packs 50. For example, the bypass bent portion 250 may absorb an assembly tolerance between adjacent battery packs 50 through elastic deformation. The bypass bent portion 250 may protrude in an opposite direction with respect to a bus bar cover 100. In order to avoid interference with the bus bar cover 100, the bypass bent portion 250 may be formed to protrude to an opposite side with respect to the bus bar cover 100, more particularly a hinge portion 105 of the bus bar cover 100.

The first and second portions 210 and 220 of the bus bar 200 may be arranged on different planes with the bypass bent portion 250 therebetween. For example, the first and second portions 210 and 220 may be arranged on inclined planes inclined at a certain angle with respect to each other. The first and second portions 210 and 220 of the bus bar 200 may be inclined with respect to each other to match a terminal structure of the battery pack 50 to be connected. Also, since the first and second portions 210 and 220 of the bus bar 200 may have a certain inclination, the first and second portions 210 and 220 of the bus bar 200 may be closely adhered between fastening members (not illustrated) including a pair of nuts and washers.

The first and second portions 210 and 220 of the bus bar 200 may be covered respectively by first and second portions 110 and 120 of the bus bar cover 100. In this case, since the hinge portion 105 may be interposed between the first and second portions 110 and 120 of the bus bar cover 100, the first and second portions 110 and 120 of the bus bar cover 100 may be closely adhered to the first and second portions 210 and 220 of the bus bar 200 inclined with respect to each other, to insulate the first and second portions 210 and 220 of the bus bar 200. For example, since the hinge portion 105 may extend across the bypass bent portion 250 between the first and second portions 110 and 120 of the bus bar cover 100 and connect the first and second portions 110 and 120 of the bus bar cover 100 pivotably with respect to each other, the first and second portions 110 and 120 of the bus bar cover 100 may be closely adhered respectively onto the first and second portions 210 and 220 of the bus bar 200 arranged on different planes. More particular technical features thereof will be described below.

The bus bar 200 may be formed to include coupling holes 200' for electrically connecting different battery packs 50. For example, the bus bar 200 may include coupling holes 200' of both end portions connected respectively to different battery packs 50. The bus bar 200 may electrically connect adjacent battery packs 50 and connect a plurality of battery packs 50 in a serial manner, in a parallel manner, or in a serial-parallel hybrid manner to provide a high-voltage high-capacity battery module for supplying driving power for a vehicle. As for the fastening of the bus bar 200, the bus bar 200 may be fastened by a fastening member (not illustrated) coupled to a terminal of the battery pack 50 through the coupling hole 200'.

An insulator C for insulating the bus bar 200 may be formed at the bus bar 200. For example, the insulator C may be formed at the bypass bent portion 250 of the center of the bus bar 200 except for both end portions thereof and may be formed by a coating of an insulating material such as epoxy or polyvinyl chloride (PVC). Since the bypass bent portion 250 may be exposed outside by protruding from the bus bar cover 100, a separate insulator C may be formed to isolate the entire bus bar 200 from the external environment.

The bus bar 200 may be covered by the bus bar cover 100. The bus bar cover 100 may include the first and second portions 110 and 120 respectively covering the first and second portions 210 and 220 of the bus bar 200. The bus bar cover 100 may prevent the short circuit of the bus bar 200 and insulate the bus bar 200 from the surrounding environment. For example, the first portion 110 of the bus bar cover 100 may be closely adhered onto the first portion 210 of the bus bar 200 to insulate the first portion 210 of the bus bar 200, and the second portion 120 of the bus bar cover 100 may be closely adhered onto the second portion 220 of the bus bar 200 to insulate the second portion 220 of the bus bar 200.

The bus bar cover 100 may include a hollow portion 150 that is open toward the coupling hole 200' at each of both end portions of the bus bar 200. The hollow portion 150 may allow a fastening operation of the coupling hole 200' by exposing the coupling hole 200' of the bus bar 200. For example, the hollow portion 150 may enable a fastening operation of the coupling hole 200' by allowing the approach of a fastening tool (not illustrated) toward the coupling hole 200'.

The bus bar cover 100 may include a pair of hollow portions 150 formed respectively at the first and second portions 110 and 120 to respectively expose the coupling holes 200' of both ends of the bus bar 200. The pair of hollow portions 150 may respectively expose the coupling hole 200' of one end of the bus bar 200 (i.e., the coupling hole 200' of the first portion 210) and the coupling hole 200' of the other end of the bus bar 200 (i.e., the coupling hole 200' of the second portion 220). The hollow portion 150 may isolate the bus bar 200 from the external environment to prevent the short circuit of the exposed bus bar 200 while exposing the coupling hole 200' of the bus bar 200. For example, the hollow portion 150 may protrude in a direction away from the bus bar 200 to isolate the bus bar 200 from the external environment by a certain distance or more. For example, an external object approaching the coupling hole 200' may be blocked by the hollow portion 150 to be prevented from directly contacting the bus bar 200 and to be isolated from the bus bar 200 by a certain distance or more.

The hollow portion 150 may be formed in a hollow cylindrical shape extending long while surrounding the coupling hole 200'. The hollow portion 150 may insulate the periphery of the coupling hole 200' by surrounding the coupling hole 200'. In this regard, the hollow portion 150 may be formed to have a sufficient size to expose the coupling hole 200' and may be formed to have a sufficiently small size to insulate the periphery of the coupling hole 200'. For this purpose, the hollow portion 150 may be formed in a hollow cylindrical shape along the outer circumference of the coupling hole 200' while surrounding the coupling hole 200'.

The bus bar cover 100 may include a pair of hollow portions 150 corresponding to the coupling holes 200' at both ends of the bus bar 200. A hinge portion 105 may be formed between the pair of hollow portions 150. The hinge portion 105 may allow the pair of hollow portions 150 to be bent at different angles. That is, by the formed hinge portion 105, the first and second portions 110 and 120 of the bus bar cover 100 may be closely and firmly adhered onto the first and second portions 210 and 220 of the bus bar 200 even when the first portion 210 of the bus bar 200 and the second portion 220 of the bus bar 200 are not arranged on the same plane but on different planes, that is, planes inclined with respect to each other.

An assembly guide 111 and a locking jaw 121 may be respectively formed at the first and second portions 110 and 120 of the bus bar cover 100 so that the first portion 110 of the bus bar cover 100 may be closely and firmly adhered to the first portion 210 of the bus bar 200 and the second portion 120 of the bus bar cover 100 may be closely and firmly adhered to the second portion 220 of the bus bar 200, with the hinge portion 105 as the boundary therebetween. As described below, the assembly guide 111 and the locking jaw 121 may be formed in different structures but may be coupled with the first and second portions 210 and 220 of the bus bar 200 such that the first and second portions 110 and 120 of the bus bar 100 may be closely and firmly adhered to the respective corresponding portions. The assembly guide 111 and the locking jaw 121 will be described below in more detail.

The bus bar cover 100 may cover the bus bar 200 in a sliding manner from one end of the bus bar 200 to the other end of the bus bar 200. The bus bar cover 100 may include an assembly guide 111 for guiding the sliding movement of the bus bar cover 100 and guiding the assembly position of the bus bar cover 100. More particularly, an assembly guide 111 may be formed at the first portion 110 of the bus bar cover 100.

Referring to FIGS. 8 and 9, the assembly guide 111 may include an assembly hole 111' to be fitted onto the bus bar 200. The bus bar cover 100 may be fitted onto the bus bar 200 while sliding in the length direction of the bus bar 200 with the assembly guide 111 fitted onto the bus bar 200.

The assembly hole 111' may be formed in a substantially rectangular shape like the sectional shape of the bus bar 200. For example, a wall defining the assembly hole 111' may include a pair of long side portions and a pair of short side portions. The bus bar 200 may be inserted into the assembly hole 111' according to the sliding movement of the bus bar cover 100, and the bus bar cover 100 may move to the assembly position while sliding along the bus bar 200 inserted into the assembly hole 111'.

An assembly protrusion 111a for fixing the position of the bus bar cover 100 may be formed at the assembly guide 111. For example, the assembly protrusion 111a may protrude from the wall of the assembly hole 111' to press the bus bar 200 at a certain pressure to prevent separation between the bus bar 200 and the bus bar cover 100. A plurality of assembly protrusions 111a may be formed along the wall defining the assembly hole 111'. For example, when the wall of the assembly hole 111' includes a pair of long side portions and a pair of short side portions, a plurality of assembly protrusions 111a may be formed along the long side portion.

A locking jaw 121 to be fitted onto the bus bar 200 may be formed at the bus bar cover 100. More particularly, a locking jaw 121 may be formed at the second portion 120 of the bus bar cover 100. The locking jaw 121 may include a pair of locking jaws 121 to be fitted onto both ends in the width direction of the bus bar 200. A pair of locking jaws 121 may be formed at positions facing each other with the bus bar 200 therebetween. The locking jaw 121 may closely adhere the bus bar cover 100 and the bus bar 200 to each other such that the bus bar cover 100 and the bus bar 200 may not be separated from each other.

The locking jaw 121 may be formed at the second portion 120 of the bus bar cover 100. More particularly, the locking jaw 121 may protrude downward from the body of the bus bar cover 100. The locking jaw 121 may form a hook coupling with the bus bar 200. A pair of locking jaw 121 may be formed at both sides of the second portion 120 of the bus bar cover 100 to face each other with the bus bar 200 therebetween. The locking jaws 121 may be engaged to both ends of the bus bar 200 to prevent separation from the bus bar 200. For example, an end portion of the locking jaw 121 may be formed in a wedge shape for hook coupling. The locking jaw 121 may be formed in an open hook structure and may be assembled from above the bus bar 200. Unlike the assembly guide 111 having a closed assembly hole 111', the open hook structure of the locking jaw 121 may be provided from a pair of locking jaws 121 arranged to face each other with the bus bar 200 therebetween.

An assembly guide 111 or an assembly protrusion 111a for fixing the position with respect to the bus bar 200 may be formed at the first portion 110 of the bus bar cover 100. A locking jaw 121 may be formed at the second portion 120 connected with the first portion 110 through the hinge portion 105, to prevent the separation from the bus bar 200 and maintain the right position of the second portion 120 closely adhered to the bus bar 200. As such, the right position of the bus bar cover 100 may be maintained by using the assembly guide 111 of the first portion 110 and the locking jaw 121 of the second portion 120.

The assembly guide 111 and the locking jaw 121 may closely adhere the first and second portions 110 and 120 of the bus bar cover 100 respectively to the first and second portions 210 and 220 of the bus bar 200. In this case, as for the assembly order of the assembly guide 111 and the locking jaw 121, the assembly guide 111 may be assembled and then the locking jaw 121 may be assembled. Referring to FIG. 4, the position of the bus bar cover 100 may be fixed by inserting the first portion 210 of the bus bar 200 into the assembly guide 111 (more particularly, the assembly hole 111' of the assembly guide 111) and then sliding the bus bar cover 100 to locate the locking jaw 121 on the second portion 220 of the bus bar 200 and pressing the locking jaw 121 from above the bus bar 200 to fit the locking jaw 121 onto both ends of the bus bar 200.

Referring to FIG. 9, since the locking jaw 121 is assembled after the assembly of the assembly guide 111, the locking jaw 121 may be formed in a hook structure such that it may be engaged from above the bus bar 200. For example, the assembly guide 111 may be formed as a closed-type assembly hole 111', whereas the locking jaw 121 may be formed as an open hook. In other words, although both the assembly guide 111 and the locking jaw 121 provide a structure for closely adhering the bus bar cover 100 to the bus bar 200, the assembly guide 111 and the locking jaw 121 may be formed in different structures such as a closed hole structure and an open hook structure, respectively, in order to provide an assemblability for the bus bar 200 as well as a suitable coupling force for the bus bar 200. When both the assembly guide 111 and the locking jaw 121 are formed in the same closed structure like the assembly hole 111', the assemblability of the bus bar cover 100 may be degraded.

When both the assembly guide 111 and the locking jaw 121 are formed in the same open structure like a hook, not only the assemblability but also the coupling force for the bus bar 200 may be degraded. The assembly guide 111 may guide the assembly position of the bus bar cover 100 to easily align the assembly position of the bus bar cover 100 on the bus bar 200. Also, the assembly guide 111 may include four surfaces (the wall defining the assembly holes 111') surrounding the bus bar 200 to firmly fix the position of the bus bar 200 and may include an assembly protrusion 111a protruding toward the bus bar 200 to provide a suitable coupling force for the bus bar 200.

The coupling between the first portion 210 of the bus bar 200 and the bus bar cover 100 may be performed by sliding the bus bar cover 100 under the guidance of the assembly guide 111. Also, the coupling between the second portion 220 of the bus bar 200 and the bus bar cover 100 may be performed by engaging the locking jaw 121 from above the second portion 220 of the bus bar 200.

In the assembly between the bus bar 200 and the bus bar cover 100, the first and second portions 210 and 220 of the bus bar 200 may be covered respectively by the first and second portions 110 and 120 of the bus bar cover 100, and the first and second portions 110 and 120 of the bus bar cover 100 may be closely adhered respectively to the first and second portions 210 and 220 of the bus bar 200 according to the adjustment of the hinge portion 105 in conformance with the inclination angle between the first and second portions 210 and 220 of the bus bar 200.

Referring to FIG. 7, an opening 107 for exposing a portion of the bus bar 200 and a barrier portion 108 surrounding the opening 107 around the opening 107 may be formed at a position adjacent to the hollow portion 150, for example, at the first portion 110 of the bus bar cover 100 adjacent to the hollow portion 150.

The opening 107 may be to allow the connection with the bus bar 200 to obtain state information such as the temperature and voltage of the bus bar 200. A voltage measurement line (not illustrated) or a thermistor (not illustrated) may be seated on the bus bar 200 through the opening 107, and the state information obtained through the opening 107 may be used as data for controlling a charge/discharge operation.

The opening 107 may be to expose a portion of the bus bar 200. However, in order to prevent a short circuit caused by the exposure of the bus bar 200, a barrier portion 108 surrounding at least a portion of the opening 107 and extending in a direction away from the bus bar 200 may be formed around the opening 107. For example, the barrier portion 108 may be formed to surround at least a portion of the opening 107 and may be formed at one side of the opening 107 to block one side of the opening 107 opposite to the hollow portion 150. Thus, the barrier portion 108 protruding to a certain height may prevent the approach of a conductive penetrant (not illustrated) toward the bus bar 200 and may isolate the bus bar 200 from the external environment by a certain distance or more.

The bus bar cover 100 may be integrally formed. The bus bar cover 100 may be integrally formed by using an insulating material. Herein, "integrally formed" may mean that the entire bus bar cover 100 is connected in a seamless manner and may mean that the entire bus bar cover 100 is formed through one process instead of being formed by combining two or more components formed through separate processes.

Although the present disclosure has been described with reference to the embodiments illustrated in the accompanying drawings, this is merely an example and those of ordinary skill in the art will understand that various modifications and other equivalent embodiments may be derived therefrom. Thus, the spirit and scope of the present disclosure should be defined by the appended claims.

INDUSTRIAL APPLICABILITY

The present disclosure may be applied to various devices using a battery as a rechargeable energy source and using a battery as a driving power supply.

The invention claimed is:

1. A battery module comprising:
   a bus bar comprising first and second portions electrically connected to respective battery packs, and a bypass bent portion between the first and second portions of the bus bar; and
   a bus bar cover covering the bus bar to insulate the bus bar,
   wherein the bus bar cover comprises first and second portions covering the first and second portions of the bus bar, and a hinge portion for providing pivotable connection between the first and second portions of the bus bar, and
   wherein the bypass bent portion protrudes away from the hinge portion.

2. The battery module of claim 1, wherein the first and second portions of the bus bar cover each comprise a hollow portion exposing a coupling hole of a respective one of the first and second portions of the bus bar, and extending in a direction away from the bus bar.

3. The battery module of claim 2, wherein the hollow portion is formed in a cylindrical shape extending while surrounding the coupling hole.

4. The battery module of claim 1, wherein the first and second portions of the bus bar are arranged on different planes.

5. The battery module of claim 4, wherein the first and second portions of the bus bar are arranged on inclined planes that are inclined with respect to each other.

6. The battery module of claim 1, further comprising an insulator at the bypass bent portion.

7. The battery module of claim 1, wherein the hinge portion extends across the bypass bent portion between the first and second portions of the bus bar cover, and connects the first and second portions of the bus bar cover, which are pivotable with respect to each other.

8. The battery module of claim 7, wherein the bypass bent portion protrudes to an opposite side with respect to the hinge portion.

9. The battery module of claim 1, wherein the first portion of the bus bar cover comprises an assembly guide for guiding assembly of the bus bar cover to the bus bar.

10. The battery module of claim 9, wherein the assembly guide defines an assembly hole into which the bus bar is inserted.

11. The battery module of claim 10, wherein the assembly guide further comprises an assembly protrusion protruding toward the bus bar from a wall defining the assembly hole.

12. The battery module of claim 11, wherein the assembly protrusion is formed along a longest side of the wall defining the assembly hole.

13. The battery module of claim 1, wherein the second portion of the bus bar cover comprises a locking jaw for preventing separation from the bus bar.

14. The battery module of claim 13, wherein the locking jaw is formed in a pair at both ends of the bus bar cover in a width direction.

15. The battery module of claim 1, further comprising:
   a closed hole-type assembly guide at the first portion of the bus bar cover; and
   an open hook-type locking jaw at the second portion of the bus bar cover.

16. The battery module of claim 2, wherein the bus bar cover further comprises a barrier portion surrounding an opening exposing a portion of the bus bar at a position adjacent to the hollow portion and extending in a direction away from the bus bar.

17. The battery module of claim 1, wherein the bypass bent portion is U-shaped, and
   wherein a bend in the hinge portion and a bend in the bypass bent portion extend toward the battery packs.

* * * * *